March 13, 1945.  S. W. MILLER  2,371,306
ELECTRODE HOLDER
Filed May 18, 1943
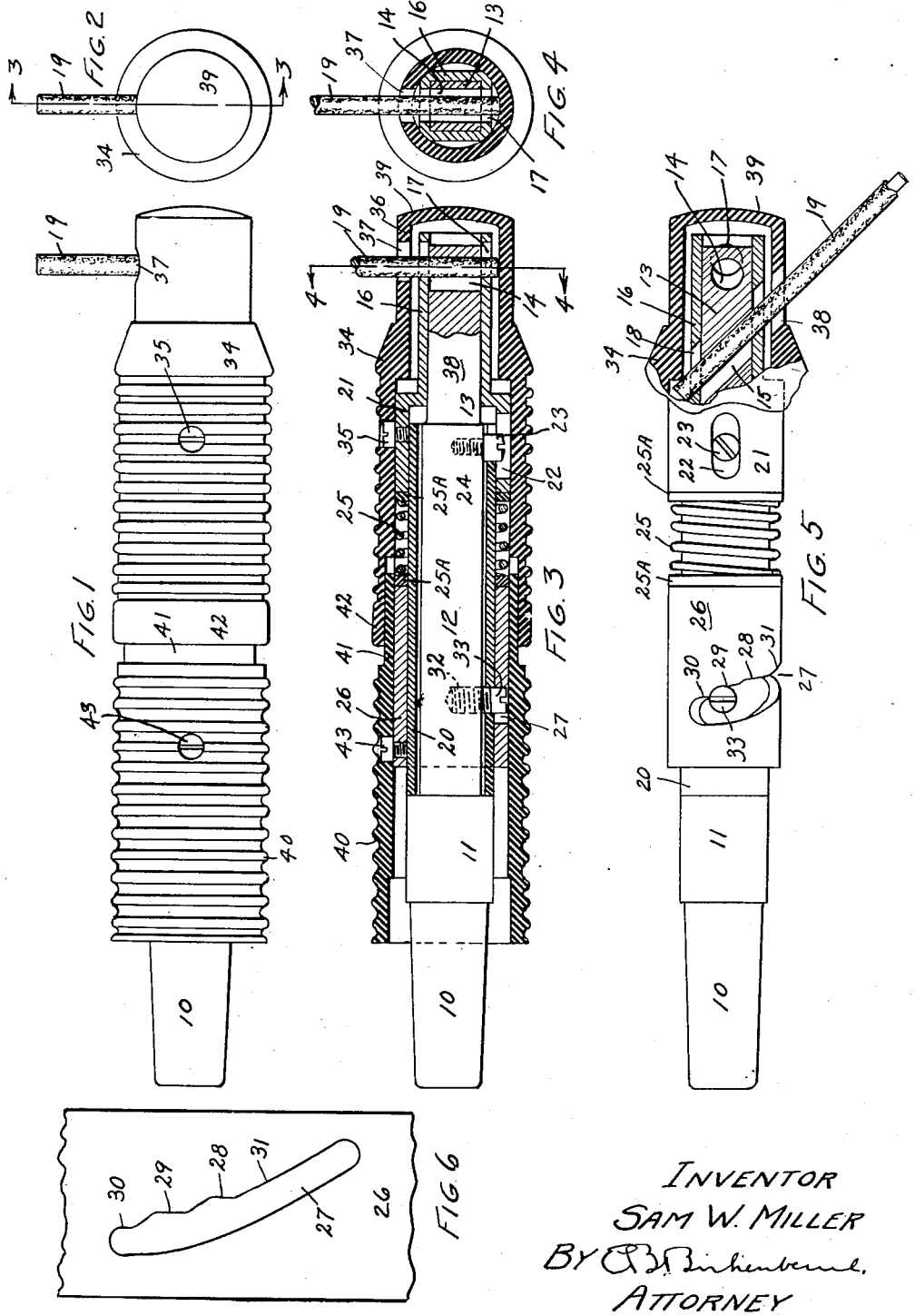
INVENTOR
SAM W. MILLER
BY
ATTORNEY Patented Mar. 13, 1945

2,371,306

UNITED STATES PATENT OFFICE 2,371,306

ELECTRODE HOLDER

Sam W. Miller, Portland, Oreg.

Application May 18, 1943, Serial No. 487,478

3 Claims. (Cl. 219—8)

This invention relates generally to the art of electric welding and particularly to an electrode holder.

The main object of this invention is to construct an electrode holder which will be of light weight and relatively small dimensions, and which will rigidly hold a welding rod in a desired position without any undue tendency to arc.

The second object is to produce an electrode holder in which there is an automatic take-up for any looseness which may develop in the contact between the holder and rod, thereby avoiding any chance for a loose connection which would otherwise damage the conducting surface of the jaws holding the rod.

The third object is to construct a holder of the class described having greater electrical carrying capacity than has the lead or cable supplying energy thereto, thereby reducing the tendency to heat by resistance to the flow of current.

The fourth object is to construct a holder of the class described whereby a greater spring tension can be used for the holding jaws, and yet make the device operable by a woman welder.

The fifth object is to make the holder or "stinger" as it is commonly called, in the form of a straight cylinder, making it easy to handle and less apt to become fouled on other objects.

The sixth object is to so construct a holder that any worn or burned or broken part may be quickly repaired by a service man with ordinary tools, and without making it necessary to take the holder into the shop for repairs—that is, permitting it to be repaired on the job in a very short space of time.

The seventh object is to completely encase all of the metal parts within a horn fiber cover, thereby preventing same from coming into contact with any other metal which may be grounded.

The eighth object is to so construct the holder that it is possible to use various sizes of rod and to vary the amount of pressure applied in order that approximately the same amount of pressure may be exerted on the rod regardless of its size.

These and other objects are accomplished in the manner set forth in the following specification, as illustrated in the accompanying drawing, in which:

Fig. 1 is a plan of the device showing a piece of welding rod held normal to the axis of the holder.

Fig. 2 is an end elevation of Fig. 1.

Fig. 3 is a longitudinal section through the holder taken along the line 3—3 in Fig. 2.

Fig. 4 is a transverse section taken along the line 4—4 in Fig. 3.

Fig. 5 is a fragmentary view showing the major portion of the insulating armor removed, and showing the holder supporting an electrode at an angle inclined from the normal position shown in Figs. 1 and 2.

Fig. 6 is a development of the operating cam.

Similar numerals refer to similar parts throughout the several views.

Referring in detail to the drawing, there is illustrated a tapered shank 10 such as is commonly provided on a "stinger" or electrode holder, by means of which they are attached to a power lead or cable (not shown). The cylindrical portion 11 has extending therefrom the core 12 which may be of any desired cross section. The core 12 terminates in the square end 13. The members 10, 11, 12 and 13 are preferably solid, and have a good electrical conductivity such as copper or a copper alloy.

The square end 13 has formed therethrough a round hole 14 whose axis is normal to the axis of the members 10, 11, 12 and 13, and a second hole 15 which is inclined away from the axis of the holder.

Slidably mounted on the end 13 is a square sleeve 16 having a hole 17 in one side thereof which can be brought into register with the hole 14, and the second hole 18 which can be brought into register with the hole 15. The holes 14 and 15 are capable of receiving the welding rod 19 when in complete register with the holes 17 and 18.

A sleeve 20 of insulating material is placed around the member 12 and has the same outside diameter as the cylindrical portion 11. The sleeve 16 has formed thereon an enlarged hub 21 provided with a slot 22 adapted to receive the head 23 of a screw 24, which is threaded into the member 12. The screw 24 is so positioned longitudinally as to act as a stop between the members 13 and 16, holding the holes 14 and 17, or the holes 15 and 18 in complete register in one direction, or permitting the holes 14 and 17 as well as the holes 15 and 18 to move out of register in the opposite direction far enough to clamp the smallest rod intended to be used therein.

On the insulating sleeve 20 is placed a spring 25 at each end of which is a fiber washer 25—A, in order to prevent the flow of current through the spring 25 and thereby reduce any tendency to heat. As constructed, the spring 25 is insulated on all sides, although the sleeve 20 is not essential.

Also placed on the sleeve 20 is the clamping sleeve 26. This sleeve is cylindrical in form and has formed therein a cam slot 27 having the three locking faces 28, 29 and 30 formed along the side 31 of the slot 27. A screw 32 is threaded into the member 12 and its head 33 extends into the slot 27. It can be seen that as the clamping sleeve 26 is rotated, the screw head 33 is moved with relation to the side 31 and can be brought into engagement with any of the faces 28, 29 and 30; and since these faces are offset with relation to each other, it follows that the sleeve 26 will be caused to slide longitudinally on the member 20, thereby varying the pressure on the spring 25 and consequently varying the clamping action upon the welding rod 19.

In order to shield the parts against grounding, there is provided a cylindrical tip 34 preferably knurled or grooved to give a better grip. The tip 34 fits snugly over the hub 21 and is secured thereto by means of a screw 35 whose head is preferably concealed by an insulating plug (not shown).

The end 36 of the tip 34 is also provided with an enlarged hole 37 which can register with the hole 17, as well as the hole 38 which can register with the hole 18. The extreme end 39 is preferably closed as shown.

At the near end of the holder is provided a cylindrical hand grip 40 which is also knurled or grooved, and which has a reduced end 41 which extends into the end 42 of the tip 34. The screw 43 secures the grip 40 to the clamping sleeve 26.

The operation of the device is as follows:

Assuming that the rod 19 is to be held normal to the axis of the holder, it is only necessary to turn the members 34 and 40 with relation to each other so that the holes 14 and 17 and 37 will be brought into register by the action of the clamping sleeve 26, then insert the welding rod 19 and rotate the member 40 with relation to the member 34 causing the screw head 33 to ride on the side 31 and pass successively to the faces 28, 29, and 30, stopping at that particular point where the right compression is placed on the rod 19 through the effort to place the holes 14 and 17 out of register. Obviously, an ideal contact is made, and any looseness which may result from abuse or wear will automatically be taken up by the pressure of the spring. Best of all, this operation can be performed with a minimum of physical exertion, placing it well within the range of a person possessing less than ordinary muscular strength. In order to release the rod 19, it is only necessary to reverse the operation.

In order to hold the rod in an inclined position as shown in Fig. 5, the same operation is performed, except that the rod 19 is inserted through the openings 38, 18, and 15.

It can be seen from the foregoing, that the device has ample current carrying capacity up to the point of contact.

Obviously, the action of the clamping member 26 may be reversed without departing from the spirit of the invention. In some cases it may be found desirable to increase the cross section of the members 13 and 16 where they are cut away to receive the rod 19, although this may not be necessary owing to the fact that the contact is so perfect as to make it highly efficient and not inclined to heat.

I claim:

1. An electrode holder consisting of a pair of telescopic members having an opening extending through both of same, capable of being brought into register with each other, a spring interposed between said members adapted to urge same in opposite directions for the purpose of moving the holes out of register, a barrel cam against which said spring reacts, one of said telescopic members having a pin projecting therefrom into said cam whereby the rotation of said cam will vary the compression of said spring and means for holding said barrel cam at a predetermined position.

2. In an electrode holder of the class described, the combination of a pair of telescopic members having an opening formed through both of same for the reception of an electrode when said holes are in register, a spring for urging said members to a non-registering position, a cam opposed to said spring for increasing the compression thereof and means for latching said cam in any of a plurality of positions for the purpose of obtaining a predetermined compression on said spring.

3. An electrode holder of the class described consisting of a tapering lead engaging shank, an insulated core forming an extension for said shank, a square end projecting from said insulated core, a square sleeve on said square end, one end of said square sleeve being cylindrical and extending around said insulated core, said square end and the square portion of said sleeve having openings formed therethrough for the reception of an electrode, a barrel cam mounted on said insulated core, a spring disposed around said insulated core between said cam and the cylindrical end of said square sleeve, the raceway in said cam having a plurality of steps formed therein, a pin projecting from said insulated core into the cam slot adapted to engage said steps, a tip of insulating material covering the foremost end of said holder, said tip having openings formed therein for the passing of an electrode, and a hand grip around the shank end of the device for rotating said cam.

SAM W. MILLER.